(12) United States Patent
Hamzik et al.

(10) Patent No.: US 11,896,932 B2
(45) Date of Patent: Feb. 13, 2024

(54) FLUORINATED FILTER MEMBRANE, FILTERS, AND METHODS

(71) Applicant: ENTEGRIS, INC., Billerica, MA (US)

(72) Inventors: James A. Hamzik, North Billerica, MA (US); Nicholas Josef Filipancic, Waltham, MA (US)

(73) Assignee: ENTEGRIS, INC., Billerica, MA (US)

( * ) Notice: Subject to any disclaimer, the term of this patent is extended or adjusted under 35 U.S.C. 154(b) by 724 days.

(21) Appl. No.: 16/354,443

(22) Filed: Mar. 15, 2019

(65) Prior Publication Data

US 2019/0282961 A1   Sep. 19, 2019

Related U.S. Application Data

(60) Provisional application No. 62/643,402, filed on Mar. 15, 2018.

(51) Int. Cl.
*B01D 63/08* (2006.01)
*B01D 63/06* (2006.01)
(Continued)

(52) U.S. Cl.
CPC .......... *B01D 63/08* (2013.01); *B01D 63/067* (2013.01); *B01D 63/14* (2013.01); *B01D 67/0088* (2013.01); *B01D 69/02* (2013.01); *B01D 69/12* (2013.01); *B01D 71/36* (2013.01); *B01D 2313/04* (2013.01); *B01D 2323/345* (2013.01); *B01D 2325/22* (2013.01)

(58) Field of Classification Search
CPC .......... B01D 2313/04; B01D 2323/30; B01D 2323/345; B01D 2325/14; B01D 2325/16; B01D 2325/22; B01D 63/067; B01D 63/08; B01D 63/14; B01D 67/0006; B01D 67/0088; B01D 69/02; B01D 69/105; B01D 69/12; B01D 69/125; B01D 71/36; B01D 67/0093; B01D 67/0079; B01D 71/02; B01D 71/32
See application file for complete search history.

(56) References Cited

U.S. PATENT DOCUMENTS 3,666,693 A    5/1972  Chapiro
4,908,236 A *  3/1990  Pitt ..................... C12M 25/02
                                                427/245
(Continued)

FOREIGN PATENT DOCUMENTS

CN    101087639 A    12/2007
CN    106010062 A    10/2016
(Continued)

OTHER PUBLICATIONS

"Temperature stability of anion exchange resins"; DOW Tech Fact Sheet, Down Corporation, Aug. 2016, pp. 1-5.
(Continued)

*Primary Examiner* — Joseph W Drodge (57) ABSTRACT

Described are filtration membranes that include a porous fluoropolymer membrane and thermally stable ionic groups; filters and filter components that include these filtration membranes; methods of making the filtration membranes, filters, and filter components; and method of using a filtration membrane, filter component, or filter to remove unwanted material from fluid.

15 Claims, 7 Drawing Sheets

(51) Int. Cl.
*B01D 69/12* (2006.01)
*B01D 71/36* (2006.01)
*B01D 63/14* (2006.01)
*B01D 69/02* (2006.01)
*B01D 67/00* (2006.01)

(56) References Cited

U.S. PATENT DOCUMENTS

| | | | |
|---|---|---|---|
| 5,350,515 | A | 9/1994 | Stark |
| 5,521,052 | A | 5/1996 | Rahman |
| 6,008,146 | A | 12/1999 | Stark |
| 6,179,132 | B1 | 1/2001 | Moya |
| 7,288,600 | B2 | 10/2007 | Moya |
| 8,668,093 | B2 | 3/2014 | Ge |
| 9,636,641 | B2 | 5/2017 | Aamer |
| 9,643,130 | B2 | 5/2017 | Ait-Haddou |
| 9,643,131 | B2 | 5/2017 | Aamer |
| 9,649,603 | B2 | 5/2017 | Ait-Haddou |
| 10,213,750 | B2 | 2/2019 | Aamer |
| 2004/0254257 | A1 | 12/2004 | Thomas |
| 2005/0197467 | A1 | 9/2005 | Komiya |
| 2006/0121217 | A1* | 6/2006 | Childs ............... B01D 67/0088 428/34.1 |
| 2006/0128872 | A1 | 6/2006 | Zipplies et al. |
| 2007/0144716 | A1* | 6/2007 | Doh .................... F28F 21/062 165/158 |
| 2010/0167100 | A1 | 7/2010 | Moore et al. |
| 2012/0234745 | A1 | 9/2012 | Jerman |
| 2013/0043183 | A1* | 2/2013 | Ge ..................... B01D 67/0093 210/490 |
| 2014/0041788 | A1 | 2/2014 | Jerman et al. |
| 2014/0042076 | A1 | 2/2014 | Jerman |
| 2015/0096933 | A1 | 4/2015 | McClary |
| 2015/0151236 | A1 | 6/2015 | Bansal |
| 2015/0315042 | A1 | 11/2015 | Lin |
| 2016/0172701 | A1 | 6/2016 | Desie et al. |
| 2016/0288062 | A1* | 10/2016 | Ait-Haddou ....... B01D 67/0095 |
| 2016/0354771 | A1 | 12/2016 | Sotaro |
| 2017/0197184 | A1 | 7/2017 | Aamer |
| 2018/0043313 | A1 | 2/2018 | Onyemauwa |
| 2020/0171436 | A1 | 6/2020 | Kawakatsu |

FOREIGN PATENT DOCUMENTS

| | | | | |
|---|---|---|---|---|
| CN | 106397805 | A | 2/2017 | |
| CN | 107096398 | A | 8/2017 | |
| CN | 107206327 | A | 9/2017 | |
| JP | 05301034 | A | 11/1993 | |
| JP | 2007111572 | A | 5/2007 | |
| JP | 2017170406 | A | 9/2017 | |
| JP | 2019523904 | A | 8/2019 | |
| KR | 20100041850 | A | 4/2010 | |
| WO | WO-9309862 | A1 * | 5/1993 | ........... B01D 29/111 |
| WO | WO-0044483 | A2 * | 8/2000 | ........... B01D 63/021 |
| WO | 200044485 | W | 12/2000 | |
| WO | 2010069277 | A3 | 1/2011 | |
| WO | 2014058470 | A1 | 4/2014 | |
| WO | 2016176468 | A1 | 11/2016 | |
| WO | 2017205722 | A1 | 11/2017 | |

OTHER PUBLICATIONS

Aiguo Lin et al: "Preparation and characterization of a new negatively charged polytetrafluoroethylene membrane for treating oilfield wastewater", Journal of Membrane Science, Elsevier BV, NL, vol. 371, No. 1, Jan. 26, 2011 (Jan. 26, 2011), pp. 286-292.

Hilal N et al: "Surface modified polymeric membranes to reduce (bio)fouling: a microbiological study using *E. coli*", Desalination, Elsevier, Amsterdam, NL, vol. 167, Aug. 15, 2004 (Aug. 15, 2004), pp. 293-300.

* cited by examiner

FLUORINATED FILTER MEMBRANE, FILTERS, AND METHODS

RELATED APPLICATIONS

This application claims the benefit of U.S. Application No. 62/643,402 filed on Mar. 15, 2018, which is hereby incorporated by reference in its entirety.

FIELD OF THE INVENTION

The following description relates to filtration membranes that include a porous fluoropolymer membrane and thermally stable ionic groups; filters and filter components (i.e., any portion, piece, subcomponent, or structure of a filter) that include these filtration membranes; methods of making the filtration membrane, filter components, and filters; and method of using a filtration membrane, filter component, or filter, to filter a fluid such as a liquid solvent to remove unwanted material from the fluid.

BACKGROUND

Filtration membranes and filter products are indispensable tools of modern industry, used to separate unwanted materials from useful materials from fluid materials. Unwanted materials include impurities and contaminants such as particles, microorganisms, and dissolved chemical species, which can be removed from a useful fluid such as water; a liquid industrial solvent, raw material, or processing fluid; or a liquid solution that has medical or pharmaceutical value. Example filters are used for removing particles and bacteria from solutions such as buffers and therapeutic-containing solutions in the pharmaceutical industry, for processing ultrapure aqueous and organic solvent solutions for use in microelectronics and semiconductor processing, and for water purification processes.

Examples of effective filtration membranes include polymeric a porous structure that have an average pore size that can be selected based on the use of the filter, i.e., the type of filtration performed by the filter. Typical pore sizes are in the micron or sub-micron range, such as from about 0.001 micron to about 10 microns. Membranes with average pore size of from about 0.001 to about 0.05 micron are generally classified as ultrafiltration membranes. Membranes with pore sizes between about 0.05 and 10 microns are generally classified as microporous membranes.

To perform a filtration function, a filter product includes a filtration membrane that is responsible for removing the unwanted material. The filtration membrane may, as required, be in the form of a flat sheet, which may be wound (e.g., spirally), pleated, or may be in the form of hollow fibers, among other configurations. The filtration membrane can be contained within a housing so that fluid that is being filtered enters through an inlet and is required to pass through the filtration membrane before passing through the outlet. Or, in alternate configurations, a portion of the entering fluid is removed through a second outlet as a concentrated stream.

To force fluid to pass through a filtration membrane, which may be a sheet (e.g., pleated) or a hollow fiber membrane, a filter must be formed with liquid-tight seals between an end or edge of a filtration membrane and a surface of another structure of the filter, a "support surface." For example, a perimeter of an end of a hollow fiber filtration membrane can be bonded to a support surface of a filter to form a liquid-tight seal at the perimeter. In examples of filters that include a sheet-type filtration membrane, the filtration membrane may be formed into a pleated cylindrical membrane, with the pleats arranged axially. Each of the edges of the filtration membrane at the two opposed ends of the pleated cylinder are thermally bonded to an end piece of a filter, in a fluid-tight seal.

A fluid-tight seal between a filtration membrane and a support surface of a filter is typically produced by a method referred to as "potting," which is a process of thermally bonding an end (e.g., edge) of a filtration membrane to a surface of a filter. The fluid-tight seal is often formed by a thermoplastic material (e.g., a melt-processable polymer) that is placed between the edge of the filtration membrane and a support surface of the filter. The thermoplastic material is contacted with the filtration membrane edge and with the support surface, is melted or softened, and is caused to flow, surround, and fill the interstitial spaces between and among the filtration membrane and the support surface. Upon cooling, the polymeric material has formed a liquid-tight seal between the filtration membrane and the filter surface.

SUMMARY

In the area of microelectronic device processing, wide varieties of liquid materials are used, many of which are used at a very high level of purity. As an example, solvents for photolithography processing of microelectronic devices must be of very high purity and, therefore, require a stable and clean filtration membrane to provide a useful source of these materials.

Liquid materials used in microelectronics processing may be highly acidic or corrosive, and commonly are used at elevated temperatures. These liquids, especially at elevated temperature, tend to dissolve or weaken many common polymeric materials used in filters, such as polyolefins and nylons. For this reason, fluorinated polymers such as poly (tetrafluoroethylene) (PTFE), which are considered to exhibit high levels of chemically inertness and thermal stability, are often used in filters for processing liquid materials used in microelectronic device processing.

To effect improved levels of filtration, ionic functional groups ("ion-exchange functional groups" or simply "ionic groups") may be included as part of a filtration membrane. Ionic functional groups may be effective in removing dissolved metal materials or particles from a fluid. One drawback of fluoropolymers is that their high degree of inertness makes it difficult to place ionic functional groups on these materials. Moreover, to be effective in a filtration membrane that has been incorporated into a filter, an ionic functional group must withstand process conditions that are commonly used to convert a filtration membrane from the form of a basic membrane, into a component of a completed filter product, including a potting step typically used to incorporate a filtration membrane into a filter. For preparing a filter that includes a filtration membrane made of fluoropolymer, the potting step is performed at a relatively high temperature, e.g., at least 200 degrees Celsius. Many ionic functional groups, however, are not thermally stable and can degrade rapidly when exposed to a temperature in this range.

In one aspect, the invention relates to a filter component. The filter component includes a filtration membrane. The filtration membrane includes: a porous fluoropolymer membrane, thermally stable ionic groups, and an edge. The filter further includes a fluoropolymer end piece. An edge of the filtration membrane is potted to the end piece to provide a fluid-tight seal along the edge.

In another aspect, the invention relates to a method of preparing a filter component that includes a filtration membrane in contact with a melt-processable fluoropolymer, with the filtration membrane including: a porous fluoropolymer membrane, thermally stable ionic groups, and an edge. The method includes: heating the filtration membrane and the melt-processable fluoropolymer to soften the melt-processable fluoropolymer.

In yet another aspect the invention relates to a filtration membrane that includes: a porous fluoropolymer membrane, and a coating on a surface of the porous fluoropolymer membrane. The coating includes thermally stable ionic groups.

BRIEF SUMMARY OF THE DRAWINGS

The drawings are schematic, are not to scale, and are not be considered to limit any aspect of the present description.

DETAILED DESCRIPTION

The present invention relates to filtration membranes that include a porous fluoropolymer membrane and thermally stable ionic groups. The invention also relates to: filters (e.g., filter cartridges) and filter components (portions, sub-assemblies, sub-components, etc., of a complete filter device) that include such a filtration membrane; methods of preparing a filtration membrane as described; methods of preparing a filter component or filter that includes a filtration membrane as described; and to methods of using a filtration membrane, filter component, or filter.

In particular, the filtration membrane includes a porous fluoropolymer membrane, and ionic groups that are sufficiently thermally stable to allow the ionic groups to be processed at relatively high temperatures in one or more steps used to convert the filtration membrane into a filter component or a filter, including a step of potting the filtration membrane to a support surface of a filter, which is performed at an elevated temperature, for example, at a temperature of at least 200 degrees Celsius.

Porous fluoropolymer membranes are known in the filtration arts, and include porous filtration membranes that may be in the form of a flat planar sheet, a hollow fiber, a flat disk, a pleated sheet, a wound sheet, or another form of a membrane that may be incorporated into a filter product. Porous fluoropolymer membranes are made of fluorinated (e.g., perfluorinated) polymers, which are known to be useful in filter products because of their desirable properties, which include a high degree of thermal stability, a high degree of chemical stability, i.e., good resistance to high temperatures and good resistance to chemical degradation, and a low level of extractable materials that may leach out of the membrane during use as a filter.

A fluorinated polymer useful in a porous fluoropolymer membrane may be either fluorinated (at least partially fluorinated) or perfluorinated (substantially fully fluorinated). A perfluorinated polymer ("perfluoropolymer"), based on common terminology, is a polymer in which all or substantially all (e.g., at least 95, 98, or 99 percent) hydrogen atoms of the polymer are replaced by fluorine atoms. A fluorinated polymer ("fluoropolymer"), based on common terminology, is a polymer that has a carbon backbone that has fluorine atoms as replacements for hydrogen atoms, but that can also include a more than insubstantial amount of hydrogen atoms, chlorine atoms, or both, attached directly to the carbon backbone, with the fluorine atom content being sufficiently high to provide the polymer with desired heat and chemical stability properties.

Examples of perfluorinated polymers useful in a fluorinated filtration membrane as described include poly(tetrafluoroethylene) (PTFE), poly(tetrafluoroethylene-co-hexafluoropropylene) (FEP), and poly (tetrafluoroethylene-co-perfluoro (alkylvinyl ether)) (PFA). Examples of fluorinated polymers useful in a fluorinated filtration membrane as described include poly (ethylene-co-tetrafluoroethylene) (ETFE), poly (chlorotrifluoroethylene) (CTFE), poly (chlorotrifluoroethylene-co-ethylene) (ECTFE), polyvinylidene fluoride (PVDF), and polyvinyl fluoride (PVF). As a particular example, the fluorinated filtration membrane may be polytetrafluoroethylene (PTFE) or expanded PTFE that is derived from at least 98 or 99 weight percent tetrafluoroethylene.

A useful porous fluoropolymer membrane may comprise, consist of, or consist essentially of fluoropolymer, perfluoropolymer, or a combination of these. A porous fluoropolymer membrane that consists essentially of fluoropolymer, perfluoropolymer, or a combination of fluoropolymer and perfluoropolymer, is a membrane that contains only fluoropolymer, perfluoropolymer, or a combination of fluoropolymer and perfluoropolymer, and not more than 2, 1, 0.5, or 0.1 weight percent of any other type of (non-fluorinated) material.

A porous fluoropolymer membrane may be characterized by a shape, and by one or more of pore size, bubble point, and thickness.

Example porous fluoropolymer membranes may have pores of a size (average pore size) to be considered either a microporous filtration membrane or an ultrafiltration membrane. A microporous membrane can have an average pore size in a range on from about 0.05 microns to about 10 microns, with the pore size be selected based on one or more factors that include: the particle size or type of impurity to be removed, pressure and pressure drop requirements, and viscosity requirements of a liquid being processed by the filter. An ultrafiltration membrane can have an average pore size in a range from 0.001 microns to about 0.05 microns. Pore size is often reported as average pore size of a porous material, which can be measured by known techniques such as by Mercury Porosimetry (MP), Scanning Electron Microscopy (SEM), Liquid Displacement (LLDP), or Atomic Force Microscopy (AFM).

Bubble point is also a known feature of a porous membrane. By a bubble point test method, a sample of porous material is immersed in and wetted with a liquid having a known surface tension, and a gas pressure is applied to one side of the sample. The gas pressure is gradually increased. The minimum pressure at which the gas flows through the sample is called a bubble point. Examples of useful bubble points of a porous fluoropolymer membrane useful according to the present description, measured using HFE 7200, at a temperature of 20-25 degrees Celsius, can be in a range from 2 to 200 psi, e.g., in a range from 20 to 80 psi.

A porous membrane as described can be in the form of a sheet having any useful thickness, e.g., a thickness in a range from 5 to 100 microns, e.g., from 20 to 50 microns.

The filtration membrane includes ionic groups that are effective to function as a filtering material, to remove unwanted materials such as particles or metals from a fluid being passed through the filtration membrane. The ionic groups are also thermally stable as described herein. For ionic groups to be incorporated into a filter component or a finished filter (e.g., cartridge) as part of a filtration membrane, the ionic groups must be sufficiently stable to withstand processing steps used to convert the filtration membrane into a component or the finished filter. Methods of assembling filter components and filters that include a porous fluoropolymer membrane often involve relatively high temperatures, due to the presence of thermally-processable fluoropolymers, which melt at relatively high temperatures, e.g., above 200 degrees Celsius. In specific, one step that is commonly used to incorporate a filtration membrane into a filter component is a "potting" step, by which the filtration membrane is secured to a surface of a filter by use of a thermally-processable polymer (e.g., a thermopolymer). For methods of potting a filtration membrane that includes a porous fluoropolymer membrane, the potting step may involve the use of a thermally-processable fluoropolymer, which may melt at a temperature of at least 200 degrees Celsius. Ionic groups that are part of the filtration membrane during a potting step must be sufficiently stable to withstand exposure to the relatively high temperature of the potting step without becoming degraded to a degree that would cause the ionic groups no longer function effectively as a filtering material.

Ionic groups (i.e., ion-containing functional groups or "ligands") useful as a component of a filtration membrane can be useful to function as a filtering material of a filtration membrane, meaning that the ionic groups exhibit filtration functionality, for example by functioning to remove certain types of materials from a fluid passing through the filtration membrane, the materials being for example a form of undesired impurity, contaminant, or other undesired solid or dissolved material such as a dissolved metal, ion, or a solid particle suspended in a liquid. Useful ionic groups, as part of a filtration membrane, can be groups that are ionic at a condition of use of a filtration membrane, either displaying a positive charge (i.e., a cation) or a negative charge (i.e. an anion), and that are also thermally stable as described herein.

Ionic groups on a filtration membrane are considered to be thermally stable if a large number of individual molecules of the chemical type of the groups (i.e., a number in a range of one or multiple moles of the group), when included as part of a coating on a surface of a filtration membrane, can be processed in a potting step as described herein without being degraded to an extent that the ionic groups are not effective to function as a filtering material. For example, preferred ionic groups can be exposed to a temperature of at least 200 degrees Celsius, e.g., at least one temperature at 200 degrees Celsius or above, for example, 220, 240, or 280, or even 300 degrees Celsius, for a time of 2, 5, or 10 minutes, with at least 50 percent of the original number of the molecules not being degraded by the exposure, i.e., with at least 50 percent of the original number of the individual molecules of the group originally present on the filtration membrane not being degraded by the exposure, and being present on the filtration membrane after the exposure.

In terms relating to using the filtration membrane to prepare a filter component, ionic groups are considered to be thermally stable if a large number of molecules of the group (i.e., a number of moles of the group), when included as part of a coating of a filtration membrane, can be exposed to a step of potting the filtration membrane onto another component of a filter (e.g., an end piece), with the potting step including heating the filtration membrane to a temperature of at least 200, 220, 240, 280, or 300 degrees Celsius for a time sufficient to produce a fluid-tight seal between the filtration membrane and the component (e.g., for 2, 5, or 10 minutes), with at least 50 percent of the original number of the ionic groups present on the filtration membrane not being degraded during the potting step, and, therefore, being present on the filter medium after the potting step.

Examples of certain general types of ionic groups that have been identified for use in a filtration membrane of the present description include ionic sulfur-containing groups, ionic phosphorus-containing groups, and ionic nitrogen-containing or ammonium-containing groups. Certain more specific examples include ionic imidazole groups, ionic pyridine, ionic sulfonate groups (e.g., sulfonic acid and salts thereof), and phosphonate groups (e.g., phosphonic acid and salts thereof).

The ionic groups can be placed at a surface of the filtration membrane by use of any method that will be effective to allow the ionic groups to effectively function as a filtering material. As one example, ionic groups can be made part of a filtration membrane, placed at a surface of the filtration membrane, by methods of grafting the ionic groups onto the filtration membrane, e.g., by understood methods of e-beam grafting of monomers onto a polymer (i.e., the porous fluoropolymer membrane).

As another example, ionic groups can be made part of a filtration membrane by providing a coating that contains the ionic groups, on a surface of the porous fluoropolymer membrane. Example coatings can be derived from reactive compounds (e.g., reactive "monomers") that include the ionic group and a reactive group, and that can be reacted with other molecules of reactive compounds, e.g., cured or polymerized, to form a coating that contains the ionic groups, and that will adhere to surfaces of the filtration membrane. As a reactive group, a reactive compound may include any group that is reactive in a controlled manner to allow the reactive group to react with other molecules of reactive compounds to form a reaction product, e.g., a cured material, polymer, oligomer, or the like, having a higher molecular weight. Example reactive groups include vinyls, acrylates, methacrylates, and other known reactive chemical moieties, often unsaturated groups, that may be cure by any curing mechanism, such as by free-radical polymerization.

To prepare a coating that contains a charged nitrogen atom, an ionic group-containing reactive compound may be a reactive imidazole-containing compound, for example 1-vinyl imidazole.

To prepare a coating that contains a charged sulfur atom (e.g., a sulfonate group), an ionic group-containing reactive compound may be a sulfonic acid compound or a sulfonic acid salt compound, such as sodium vinyl sulfonate (SVS) (alternately, in acid form, vinyl sulfonic acid). Another example is sodium 4-vinylbenzenesulfonate or another acid or salt form thereof.

To prepare a coating that contains a charged phosphorus atom (e.g., a phosphonate), an ionic group-containing reactive compound may be a phosphonic acid compound or a phosphonic acid salt compound, such as vinyl phosphonic acid, ethenylphosphonic acid, or a salt thereof.

A coating as described, containing an ionic group derived from a reactive compound that contains the ionic group, can be formed by methods of chemical curing or polymerizing one or more of the reactive compounds. The coating can be prepared from a liquid coating solution that contains one or more reactive compounds (e.g., monomers), and that optionally includes one or more additional reactive or non-reactive ingredients such as: solvent (e.g., organic solvent, water, or both); one or more additional reactive compounds (e.g., a reactive vinyl, acrylate, or methacrylate compound) that do not contain an ionic group, referred to as a "co-reactant"; initiator to initiate reaction of the reactive groups of the coating solution; or a combination of these.

Examples of co-reactants that may be useful in a coating solution generally include reactive compounds that do not contain an ionic group but that do contain one or more reactive vinyl, acrylate, or methacrylate groups. A co-reactant may be a mono-functional reactive compound that contains a single reactive group such as vinyl, acrylate, or methacrylate, or may be multi-functional, e.g., di-functional, containing two or more such reactive groups, allowing the co-reactant to function as a crosslinker. Non-limiting examples of mono-functional co-reactants include mono-acrylates and mono-methacrylates such as ethyl methacrylates (e.g., 2-(dimethylamino)ethyl methacrylate). Examples multi-functional co-reactants include di-acrylate compounds and a di-vinyl compound, including more specifically bis-acrylamide compounds such as methylene bis acrylamide, and divinyl compounds such as divinyl ether compounds (e.g., 1,4-butanediol divinyl ether).

Of the total amount of reactive compounds in a coating solution, the coating solution can contain any desired relative amounts of reactive compound that includes an ionic group, relative to reactive compounds that do not contain an ionic group (i.e., co-reactant). Example coating solutions may include from 10, 20, or 25, up to 95, e.g., from 30 to 90, or from 50 to 85 weight percent reactive compound that include an ionic group, and from 5 to 90, 80, or 75, e.g., from 10 to 70, or from 15 to 50 weight percent of reactive compound that does not include an ionic group, based on total weight of all types of reactive compounds.

Example coating solutions may contain solvent in any useful amount, e.g., from at least 5, 20, 40, or 50 weight percent, up to 60, 80, 90, or 95 weight percent organic or aqueous solvent (or a combination of organic and aqueous solvent) based on total weight of a coating solution, with the balance of the solution being reactive compounds. The solvent may be water or organic compound, or a blend thereof, that will be effective to form a solution that contains reactive compounds as described. Examples of organic solvents include alkanols such as methanol.

In some embodiments, the liquid coating solution includes from 25 to 90 parts by weight ionic group-containing reactive compound, and from 10 to 75 parts by weight non-ionic group-containing reactive compound, based on total weight reactive compounds in the liquid coating solution. In some embodiments, the ionic group-containing reactive compound may be selected from 1-vinyl imidazole, vinyl pyridine, vinyl sulfonic acid, vinyl phosphonic acid, and sodium 4-vinylbenzenesulfonate. In some embodiments, the non-ionic group-containing reactive compound may be selected from: methylene bis acrylamide, 2-(dimethylamino)ethyl methacrylate, and 1,4-Butanediol divinyl ether.

The coating solution can be applied to the porous fluoropolymer membrane by use of any effective equipment and method. A liquid coating solution can be applied to a surface of the porous fluoropolymer membrane in an amount that will cause the solution to reside at the coated surface, and to optionally penetrate into the porous surface, as desired. After being applied to the porous fluoropolymer membrane the coating may be cured or dried by a desired method.

The amount of the coating solution applied to the porous fluoropolymer membrane can be an amount that provides a desired amount of the ionic groups on the filtration membrane. An amount of ionic groups that is present on a filtration membrane can be determined quantitatively using known methods and equipment, such as by dye binding methods that approximate an amount of charge on a membrane based on an amount of uptake of a detectable dye molecule, which can then be measured by colorimetry (see Example 2, herein).

The filtration membrane can be used in a filter (e.g., a filter cartridge) that contains the filtration membrane as a component through which fluid passes, to remove undesired material from the fluid. A "filter" refers to a structure that contains the filtration membrane and additional structures such as a frame, housing, and flow control structures, that together allow fluid to be directed through the filter, while passing through the filtration membrane, for the filtration membrane to function to filter unwanted material from the fluid.

An example filter can be referred to as a filtration cartridge, which includes a housing with an inlet and an outlet, and with a filtration membrane as described contained within the housing and located between the inlet and the outlet. The filtration membrane can be located and sealed within the housing in a manner to require that any fluid that enters the filter inlet will be caused to flow through the filtration membrane before passing through the outlet of the housing to leave the filter. Within the housing, the filtration membrane may take any shape or form, such as a hollow filter membrane, disk-shaped membranes, or a sheet-like membrane that may be wound or pleated.

The filtration membrane may be contained within the filter structure by various additional materials and structures that support the filtration membrane within the filter and cause fluid to flow through the filtration membrane when passing through the filter. Examples of such structures for a filter that includes a cylindrical pleated filtration membrane include the following, any of which may be included in a filter construction but may not be required: a rigid or semi-rigid core that supports the cylindrical pleated filtration membrane at an interior opening of the cylindrical pleated filtration membrane; a rigid or semi-rigid cage that supports the cylindrical pleated filtration membrane at an exterior of the pleated membrane; a seaming material that connects the longitudinal edges of the pleated filtration membrane along a length-wise seam of the cylindrical membrane to form the membrane into a pleated cylinder; a fenestrated membrane support material (e.g., in the form of a fenestrated net or mesh) that supports a major surface of the filtration membrane through which fluid flows, but that is not required to be effective as a filtering material; end pieces or "pucks" that are situated at each of the two opposed ends of the cylindrical pleated filtration membrane; a potting compound in the form of a melt-processable fluoropolymer that can be used thermally bonding an edge of the filtration membrane to an end piece; and a lamination film, which is located at the opposed end edges of the cylindrical pleated membrane where the edges meet the end pieces.

According to certain preferred filter embodiments, all surfaces, e.g., all components (all structures, pieces, etc.), of a filter that will contact fluid that passes through the filter can preferably be formed of a fluorinated of perfluorinated polymeric material. These include required or optional components such as a core, cage, seaming material, membrane support material, end pieces, and lamination film, as well as any other components of the filter structure such as flow control surfaces, gaskets, adhesives, sealants, grommets, inlets, outlets, housing components, etc. Filters that are made entirely of components made of fluoropolymer materials, e.g., perfluoropolymer materials, and that contain entirely fluoropolymer structures and surfaces at locations that contact fluid that passes through the filter, are sometimes referred to "all Teflon," or "all fluoropolymer" filters. These filters can be considered to consist of or to consist essentially of fluoropolymer materials, e.g., to consist of or consist essentially of perfluoropolymer materials. A filter (or filter component) that consists essentially of fluoropolymer materials or perfluoropolymer materials is a filter (or filter component) that contains structures that are made of at least 90, 95, 98, or 99 percent by weight fluoropolymer or perfluoropolymer materials (or a combination thereof), and not more than 10, 5, 2, or 1 weight percent of non-fluorinated materials or structures, based on total weight of the filter.

Examples of fluorinated and perfluorinated polymers that may be useful as a material of any of the structures of a filter as described herein include various melt-processable fluoropolymers. A melt-processable fluoropolymer is a fluorinated (e.g., either partially fluorinated or fully fluorinated (perfluorinated)) polymer that is capable of reversibly softening or melting to become pliable or flowable when heated to a temperature above a softening temperature characteristic of the material, and that will re-solidify when cooled to a temperature below the softening temperature. Preferred melt-processable fluoropolymers may be heated to reversibly soften or melt, then cooled and re-solidified, repeatedly, without substantial degradation of the fluoropolymer. Specific examples of melt-processable fluoropolymers include PFA and FEP.

Figure 1A:
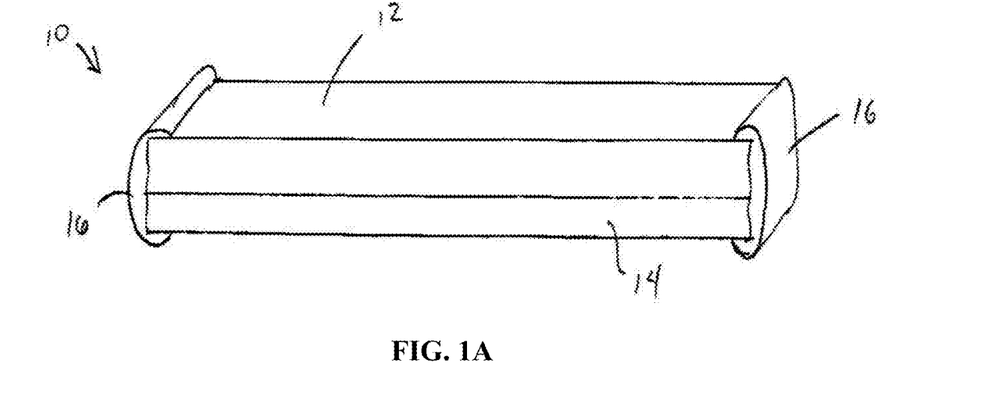
FIGS. 1A, 1B, and 1C exemplary filter components of the present description, including a filtration membrane, as end-perspective, top, and top views.

Referring now to FIG. 1A, illustrated is a single, non-limiting example of filtration membrane as described herein, in the form of a sheet-style membrane, as part of a filter component. Filter component 10 includes a filtration membrane 12, as described herein, including a porous fluoropolymer membrane that includes a coating (not specifically shown) that contains ionic groups as described. Placed against a major surface of filtration membrane 12 is membrane support material 14, which is preferably a fluoropolymer mesh or netting material (e.g., a perfluoropolymer material such as PFA). Along edges of membrane 12 and support material 14, at each of two opposed ends of the combined layers, 14 are amounts of lamination film 16, which are placed along the ends to hold the edges together. Lamination film 16 can be made of a fluoropolymer, preferably a melt-processable fluoropolymer material (e.g., perfluoropolymer material such as PFA).

Figure 1B:
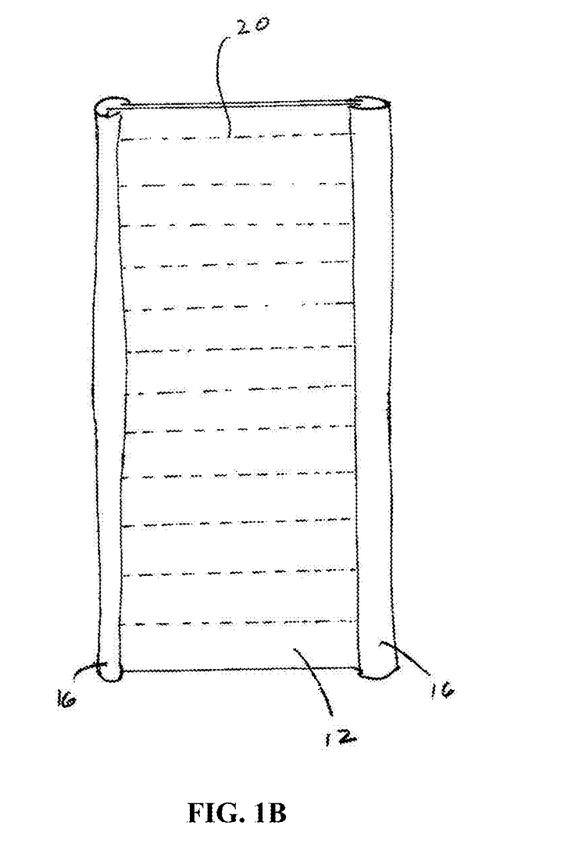
Figure 1C:
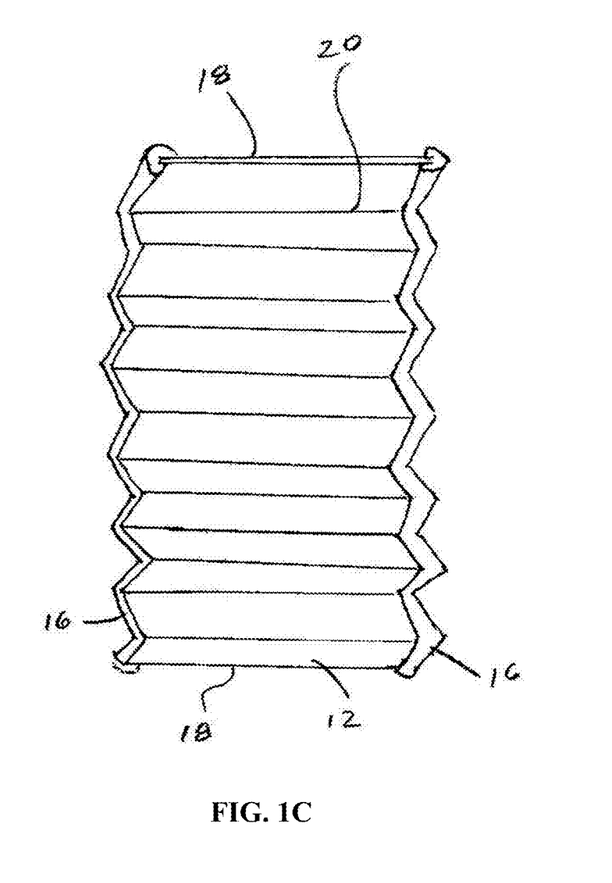

Referring to FIGS. 1B and 1C, filter component 10 may be processed to form pleats 20 in a longitudinal direction. After pleats 20 are formed, opposed ends 18 can be connected by use of a seaming material (not shown), which may be a melt-processable fluoropolymer material (e.g., a melt-processable perfluoropolymer material such as PFA).

Figure 1D:
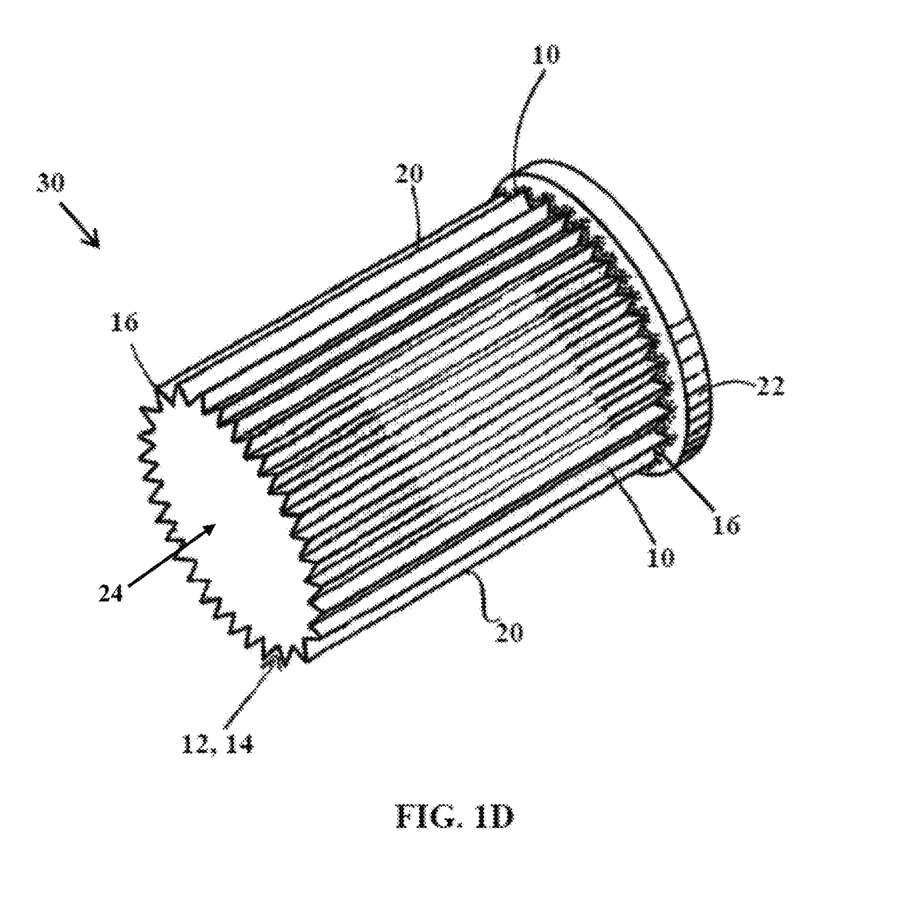
FIG. 1D is a side perspective view of an exemplary filter component of the present description, including a filtration membrane potted to an end piece.

Referring to FIG. 1D, with opposed ends 18 (not specifically shown at FIG. 1D) connected by the seaming material, component 10 is formed into a component 30, in the form of a cylindrical pleated membrane that includes pleated filtration membrane 12 and pleated membrane support material 14, held together by lamination film 16 and potted at one end to end piece 22.

FIG. 1D shows filter component 30, which is a product of pleated cylindrical component 10 and end piece 22, to which an edge at one end of cylindrical filter component 10 is potted. End piece 22 can preferably be made of a melt-processable fluoropolymer material (e.g., melt-processable perfluoropolymer material such as PFA). A step of potting cylindrical component 10 to end piece 22 includes heating cylindrical component 10 and end piece 22 to a temperature that will soften melt-processable fluoropolymer materials of end piece 22 and lamination film 16, and pressing the end of component 10 into a surface of end piece 22. The heating temperature, contact pressure, and amount of time for the potting step can be sufficient to allow softening or melting of the melt-processable fluoropolymer materials, and flow of the fluoropolymer materials relative to the edge at the end of cylindrical component 10 that are sufficient to cause the entire edge of filtration membrane 12 to become covered or permeated with the melt-processable fluoropolymer, to produce a seal along the edge that will not allow fluid (e.g., liquid) to pass around the edge, i.e., to produce a fluid-tight (especially a liquid tight) seal.

In other steps of converting a filtration membrane 12 into a filter component or a filter, a core (not shown) can be placed at the interior opening 24 of pleated cylindrical component 10, and a cage (not shown) can be placed about the exterior of pleated cylindrical component 10, e.g., before the potting step, before the described potting step.

In yet another additional step can be to pot a second end piece (not shown) to the second end of pleated cylindrical component 30 of FIG. 1D. The resultant pleated cylindrical component, with two opposed potted ends and optional core and cage, can then be placed into a filter housing that includes an inlet and an outlet and that is configured so that an entire amount of a fluid entering the inlet must necessarily pass through filtration membrane 12 before exiting the filter at the outlet.

According to one useful series of steps, a filtration membrane as described, and optional fluoropolymer support layer, can first be processed to heat laminate two opposed edges of a sheet of the material, using FEP as a laminating film. That filtration membrane and optional support layer, with heat laminated edges, are then pleated and the pleated membrane is seamed into a circular "pleat pack" using FEP to connect the remaining two edges. A PFA core structure is inserted into the middle of the pleat pack, and the pleat pack is inserted into a PFA cage. This assembly (or "cartridge") is ready to be potted to two PFA end pieces (or "pucks"), by thermally bonding one puck to each end of the pleated cylinder. The PFA pucks and the FEP laminating film at the end edges of the pleated cylinder are softened by exposure to a heating element for 5 minutes (e.g., from 3 to 7 minutes), after 5 minutes the cartridge is lowered into the softened PFA puck and potting step is complete.

The filter housing can be of any useful and desired size, shape, and materials, and can preferably be a fluorinated polymer such as a poly(tetrafluoroethylene-co-perfluoro (alkyvinylether)), TEFLON® perfluoroalkoxyalkane (PFA), perfluoromethylalkoxy (MFA), or another suitable fluoropolymer (e.g., perfluoropolymer).

A filtration membrane as described herein, or a filter or filter component that contains the filtration membrane, can be useful in a method of filtering to purify or remove unwanted materials from a liquid chemical. The liquid chemical may be of any of various compositions, and may be a liquid chemical that is useful or used in any application, for any industrial or commercial use. Particular examples of filters as described can be used to purifying a liquid chemical that is used or useful in a semiconductor or microelectronic fabrication application, e.g., for filtering a liquid solvent used in a method of semiconductor photolithography.

The fluid can be any fluid, e.g., a solvent, that is required to exhibit a very high level of purity when used in a method of semiconductor photolithography, including a very low level of dissolved metals, and very low level of suspended particles or other impurities or contaminants. Some specific, non-limiting, examples of solvents that can be filtered using a filtration membrane as described include: n-butyl acetate (nBA), isopropyl alcohol (IPA), 2-ethoxyethyl acetate (2EEA), a xylene, cyclohexanone, ethyl lactate, methyl isobutyl carbinol (MIBC), methyl isobutyl ketone (MIBK), isoamyl acetate, undecane, propylene glycol methyl ether (PGME), and propylene glycol monomethyl ether acetate (PGMEA).

EXAMPLES

Example 1

PTFE Surface Modified with Negatively Charged AMPS Monomer

Figure 2:
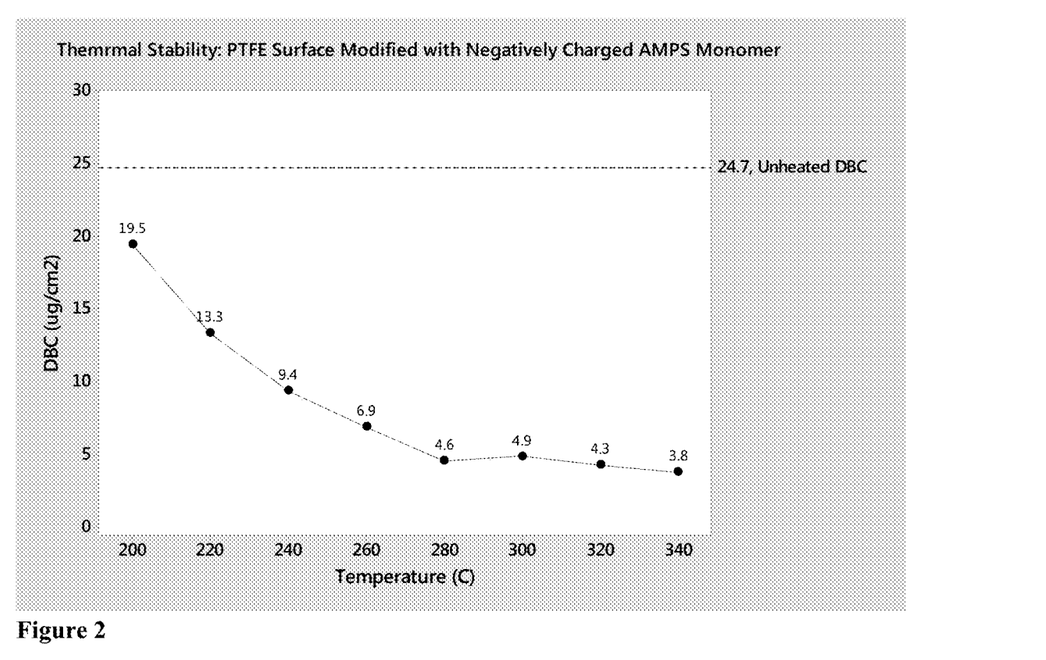
FIGS. 2 through 9 show data relating to thermal stability of ionic groups.

This example demonstrates surface modification of PTFE membrane with a negatively charged monomer, 2-Acrylamido-2-methyl-l-propanesulfonic acid (AMPS). The negatively charged ionic group of this monomer is shown at FIG. 2 to be not thermally stable.

A negatively charged PTFE membrane was produced by surface modification. The surface modification was achieved by applying a photo initiated cross-linked coating that incorporated the negatively charged monomer AMPS. First, the unmodified PTFE membrane was cut into 47 mm diameter coupons, and then submerged in 100% isopropanol to wet the membrane. Next, the IPA wet membrane coupons were exchanged in a solution of 10% hexylene glycol. The exchanged membrane coupons were then submerged in AMPS Monomer Solution (Table 1) to imbibe the membrane with monomer solution. The coupons were removed from the monomer solution and immediately placed between two clear polyethylene sheets and run through a Fusion Systems broad band UV lamp at a speed of 30 feet/minute. The UV cured membrane coupons were washed with water and twice with methanol, and then dried.

TABLE 1

AMPS Monomer Solution

| Methanol (g) | Irgacure 2959 (g) | Methylene bis Acrylamide (g) | 2-Acrylamido-2-methyl-1-propane-sulfonic acid (g) | Deionized Water (g) |
|---|---|---|---|---|
| 10 | 0.28 | 1 | 2.75 | 85.97 |

Example 2

Determination of Dye Binding Capacity of Negatively Charged PTFE Membranes

This example demonstrates how an amount of negative charge present on a treated porous fluoropolymer membrane can be approximated by measuring the uptake of the positively charged dye molecule Methylene blue.

This method is used to measure the amount of charge applied to a surface-modified PTFE membrane. First, each coupon (e.g., of Example 1) is rewet in isopropanol and immediately placed in a 50 mL conical tube containing 50 mL of a dilute (0.00075% weight percentage) methylene blue dye (Sigma Aldrich) feed solution and the tube is capped and rotated for 2 hours. After 2 hour rotation, the membrane coupon is removed from the methylene blue solution and placed in a 50 mL conical tube containing 50 mL of 100% solution of isopropanol, the tube is capped and rotated for 0.5 hours. After rotation in isopropanol the membrane coupon is confirmed visually to by dyed blue and the coupon is dried. The UV absorbance of the dilute methylene blue feed solution is measured and compared to that of the solutions the coupon has been rotated in. By determining the difference in UV absorbance from the original solution in comparison to the rotated solutions, a final "Dye-Binding Capacity" (DBC) can be calculated and expressed in µg of dye/cm2 membrane. This number is an approximation of the level of charged functional groups on the surface of a membrane and is correlated to the level of membrane ion-exchange capacity. The DBC for the PTFE Surface Modified with Negatively Charged AMPS Monomer was determined to be 24.7 µg/cm2.

Example 3

Determination of Thermal Stability of Negatively Charged PTFE Membranes

Thermal stability of surface modified PTFE was determined by heating modified membrane coupons and measuring the change in Dye Binding Capacity before and after exposure to elevated temperature.

Surface modified PTFE membrane coupons were placed in a pre-heated oven for 10 minutes each at temperatures ranging from 200° C. to 340° C. Each membrane was only heated at one temperature and there was no repeated heat exposure for a single membrane. After each coupon was exposed to heat, the membranes were allowed to cool and the Dye Binding Capacity test performed similar to Example 2. The loss in DBC after heat exposure is indicative of the thermal stability of the charged functional group. These results for the thermal stability of PTFE Surface Modified with Negatively Charged AMPS Monomer (see Example 1) are depicted in FIG. 2, and indicate a lack of thermal stability of the ionic group of the AMPS monomer.

Example 4

PTFE Surface Modified with Negatively Charged SVS Monomer

Figure 3:
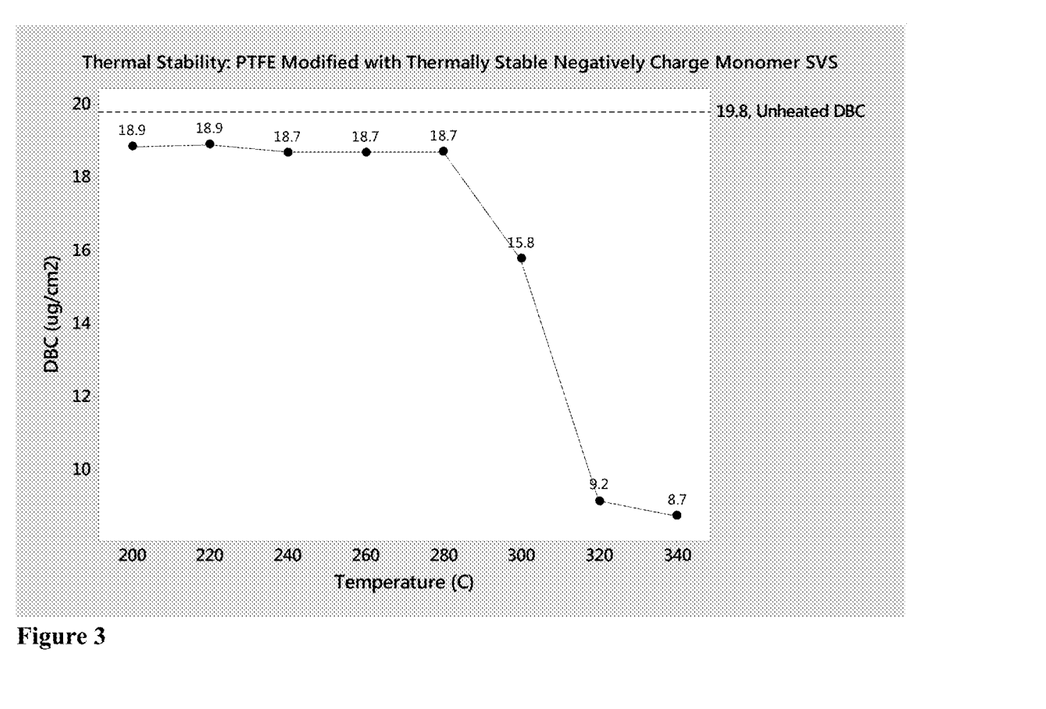

This example demonstrates surface modification of PTFE membrane with a negatively charged monomer, Sodium Vinyl Sulfonate (SVS), and thermal stability of the charged functional group provided by SVS (see FIG. 3).

A negatively charged PTFE membrane was produced by surface modification. The surface modification was achieved by applying a photo initiated cross-linked coating that incorporated the negatively charged monomer SVS using a method similar to Example 1 with the exception of the monomer solution which contained SVS as shown in Table 2. Next, the Dye Binding Capacity was determined using the method in Example 2. The Dye Binding Capacity for PTFE Surface Modified with Negatively Charged SVS Monomer was determined to be 19.8 µg/cm$^2$. Finally, the thermal stability of the PTFE Surface Modified with Negatively Charged SVS Monomer was determined by heating modified membrane coupons and measuring the change in Dye Binding Capacity before and after exposure to elevated temperature. These results for the thermal stability of the PTFE Surface Modified with Negatively Charged SVS Monomer are depicted in FIG. 3.

TABLE 2

| | | SVS Monomer Solution | | |
|---|---|---|---|---|
| Methanol (g) | Irgacure 2959 (g) | Methylene bis Acrylamide (g) | Sodium Vinyl Sulfonate (g) | Deionized Water (g) |
| 10 | 0.28 | 1 | 5 | 83.72 |

Example 5

PTFE Surface Modified with Negatively Charged VPA Monomer

Figure 4:
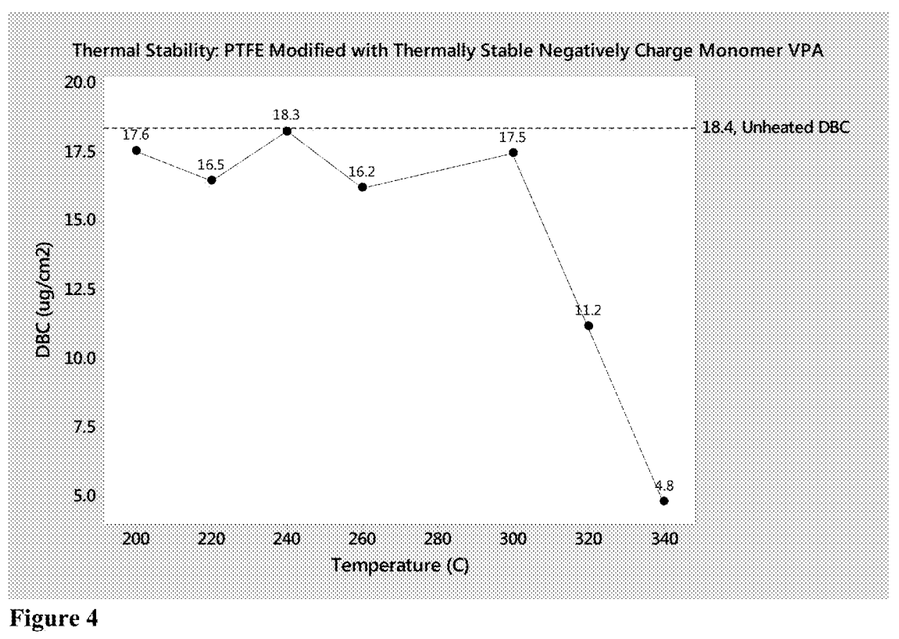

This example demonstrates surface modification of PTFE membrane with a negatively charged monomer, Vinyl Phosphonic Acid (VPA), and thermal stability of the charged functional group provided by VPA (see FIG. 4).

A negatively charged PTFE membrane was produced by surface modification. The surface modification was achieved by applying a photo initiated cross-linked coating that incorporated the negatively charged monomer VPA using a method similar to Example 1 with the exception of the monomer solution which contained VPA as shown in Table 3. Next, the Dye Binding Capacity was determined using the method in Example 2. The Dye Binding Capacity for PTFE Surface Modified with Negatively Charged VPA Monomer was determined to be 18.4 µg/cm$^2$. Finally, the thermal stability of the PTFE Surface Modified with Negatively Charged VPA Monomer was determined by heating modified membrane coupons and measuring the change in Dye Binding Capacity before and after exposure to elevated temperature. These results for the thermal stability of the PTFE Surface Modified with Negatively Charged VPA Monomer are depicted in FIG. 4.

TABLE 3

| | | VPA Monomer Solution | | |
|---|---|---|---|---|
| Methanol (g) | Irgacure 2959 (g) | Methylene bis Acrylamide (g) | Vinyl Phosphonic Acid (g) | Deionized Water (g) |
| 10 | 0.28 | 1 | 5 | 83.72 |

Example 6

PTFE Surface Modified with Positively Charged APTAC/DADMAC Monomer

This example demonstrates surface modification of PTFE membrane with positively charged monomers, (3-Acrylamidopropyl)trimethylammonium chloride (APTAC), and Diallyldimethylammonium chloride (DADMAC).

A positively charged PTFE membrane was produced by surface modification. The surface modification was achieved by applying a photo initiated cross-linked coating that incorporated the positively-charged monomer APTAC. First, the unmodified PTFE membrane was cut into 47 mm diameter coupons, and then submerged in 100% isopropanol to wet the membrane. Next, the IPA wet membrane coupons were exchanged in a solution of 10% hexylene glycol. The exchanged membrane coupons were then submerged in APTAC/DADMAC Monomer Solution (Table 4) to imbibe the membrane with monomer solution. The coupons were removed from the monomer solution and immediately placed between two clear polyethylene sheets and run through a Fusion Systems broad band UV lamp. The UV-cured membrane coupons were washed with water and twice with methanol, and then dried.

TABLE 4

| | | | APTAC/DADMAC Monomer Solution | | | |
|---|---|---|---|---|---|---|
| Methanol (g) | Irgacure 2959 (g) | Methylene bis Acrylamide (g) | (3-Acrylamidopropyl)-trimethylammonium chloride (g) | Diallyldimethylammonium chloride (g) | 2-(Dimethylamino)ethyl methacrylate (g) | Deionized Water (g) |
| 10 | 0.28 | 1 | 0.4 | 3 | 0.5 | 84.82 |

Example 7

Determination of Dye Binding Capacity of Positively Charged PTFE Membranes

This example demonstrates how an amount of positive charge can be approximated by measuring uptake of the negatively charged dye molecule Ponceau S.

This method is used to measure the amount of a positive charge applied to a surface modified PTFE membrane. First, each coupon is rewet in isopropanol and immediately placed in a 50 mL conical tube containing 50 mL of a dilute (0.0025% weight percentage) Ponceau S dye (Sigma Aldrich) feed solution and the tube is capped and rotated for 2 hours. After 2 hour rotation, the membrane coupon is removed from the Ponceau solution and placed in a 50 mL conical tube containing 50 mL of 100% solution of isopropanol, the tube is capped and rotated for 0.5 hours. After rotation in isopropanol the membrane coupon is confirmed visually to by dyed red and the coupon is dried. The UV absorbance of the Ponceau S feed solution is measured and compared to that of the solutions the coupon has been rotated in. By determining the difference in UV absorbance from the original solution in comparison to the rotated solutions, a final "Dye-Binding Capacity" (DBC) can be calculated and expressed in µg of dye/cm2 membrane. This number is an approximation of the level of charged functional groups on the surface of a membrane and is correlated to the level of membrane ion-exchange capacity. The DBC for the PTFE Surface Modified with Positively Charged APTAC/DADMAC Monomer was determined to be 7.34 µg/cm2.

Example 8

Determination of Thermal Stability of Positively Charged PTFE Membranes

Thermal stability of surface modified PTFE was determined by heating modified membrane coupons and measuring the change in Dye Binding Capacity before and after exposure to elevated temperature.

Surface modified PTFE membrane coupons were placed in a pre-heated oven for 10 minutes each at temperatures ranging from 200° C. to 340° C. Each membrane was only heated at one temperature and there was no repeated heat exposure for a single membrane. After each coupon was exposed to heat, the membranes were allowed to cool and the Dye Binding Capacity test performed similar to Example 7. The loss in DBC after heat exposure is indicative of the thermal stability of the charged functional group. These results for the thermal stability of PTFE Surface Modified with Positively Charged APTAC/DMAM Monomer are depicted in FIG. 5.

Figure 5:
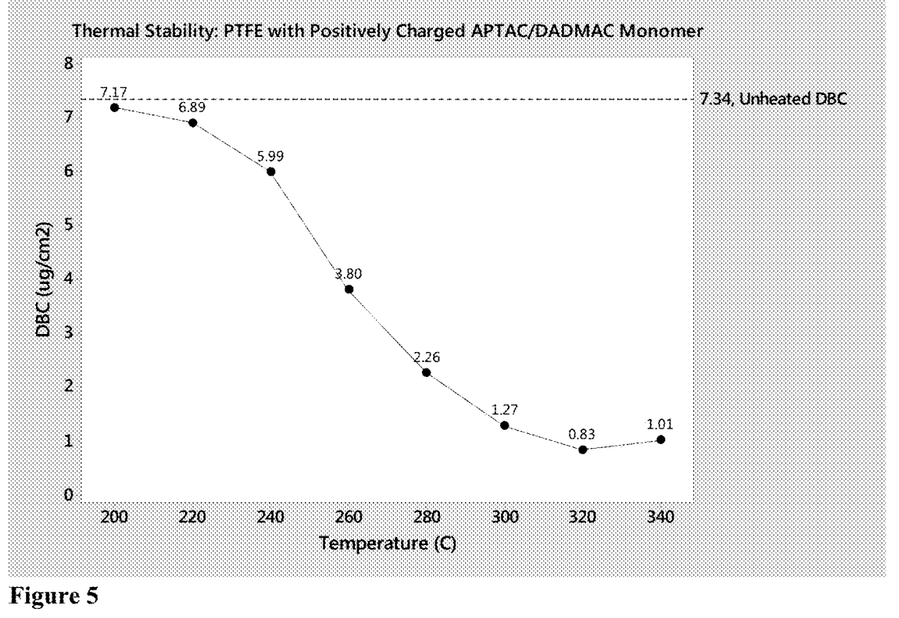

FIG. 5 shows thermal stability data for positively-charged ionic groups of APTAC/DADMAC monomers. Another positively-charged ionic group from a different monomer, i.e., triallylamine (TAA) monomer, was also found to be not thermally stable.

Example 9

PTFE Surface Modified with Positively Charged (1-vinylimidazole) Monomer

Figure 6:
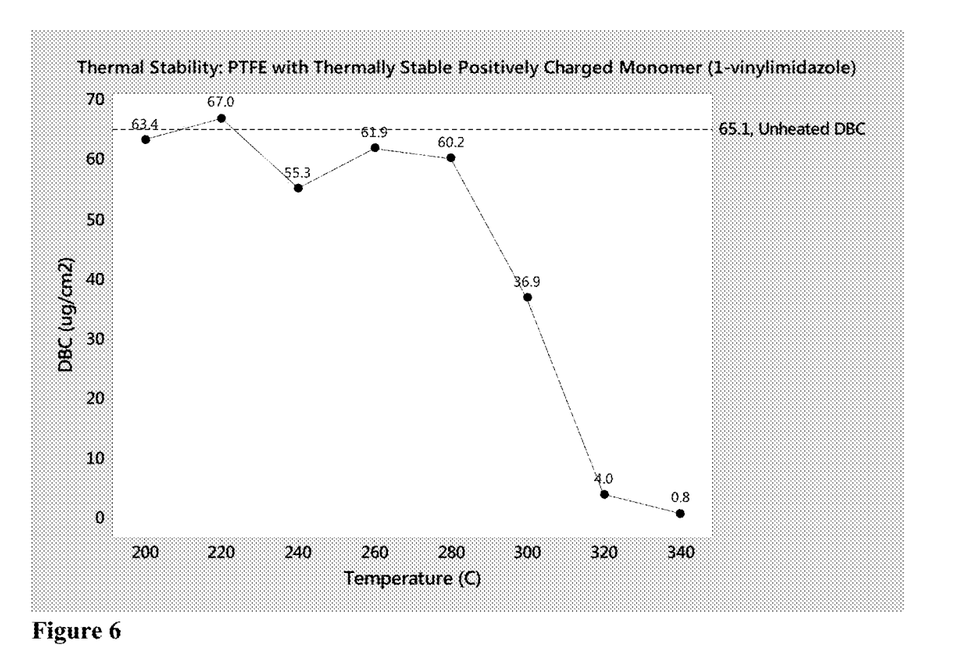

This example demonstrates surface modification of PTFE membrane with a positively charged monomer (1-vinylimidazole), and thermal stability of the positively-charged functional groups provided by 1-vinylimidazole (see FIG. 6).

A positively charged PTFE membrane was produced by surface modification. The surface modification was achieved by applying a photo initiated cross-linked coating that incorporated the positively charged monomer (1-vinylimidazole) using a method similar to Example 6 with the exception of the monomer solution which contained (1-vinylimidazole) as shown in Table 5. Next, the Dye Binding Capacity was determined using the method in Example 7. The Dye Binding Capacity for PTFE Surface Modified with Positively Charged (1-vinylimidazole) Monomer was determined to be 65.1 µg/cm$^2$. Finally, the thermal stability of the PTFE Surface Modified with Positively Charged (1-vinylimidazole) Monomer was determined by heating modified membrane coupons and measuring the change in Dye Binding Capacity before and after exposure to elevated temperature. These results for the thermal stability of the PTFE Surface Modified with Positively Charged (1-vinylimidazole) Monomer are depicted in FIG. 6.

TABLE 5

| (1-vinylimidazole) Monomer Solution | | | | |
|---|---|---|---|---|
| Methanol (g) | Irgacure 2959 (g) | Methylene bis Acrylamide (g) | (1-vinylimidazole) (g) | Deionized Water (g) |
| 10 | 0.28 | 1 | 0.5 | 88.22 |

Example 10

Figure 7:
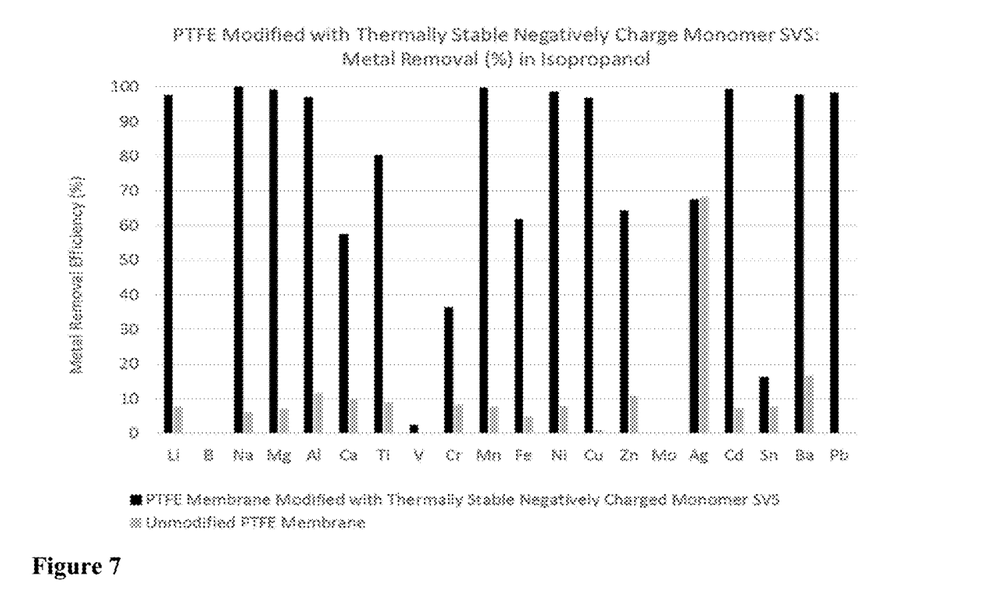

Removal of Metals from Isopropanol by Filtration with PTFE Membrane Modified with the Thermally Stable Negatively Charged Monomer SVS This example demonstrates the ability of PTFE membrane modified with the thermally stable negatively charged monomer SVS to reduce metals in isopropanol during filtration. Negatively charged PTFE membranes were prepared using a method similar to Example 4 and cut into 47 mm membrane coupons. These membrane coupons were conditioned by washing several times with 10% HCl followed by soaking in 10% HCl overnight and equilibrated with deionized water and secured into a clean 47 mm Filter Assembly (Savillex). The membrane and filter assembly were flushed with Isopropanol Gigabit (KMG) which is also the application solvent. As a control sample, native, Unmodified PTFE was also prepared and conditioned and secured into a filter assembly using the same method. The application solvent was spiked with CONOSTAN Oil Analysis Standard S-21 (SCP Science) at a target concentration of 5 ppb of each metal. To determine the filtration metal removal efficiency the metal spiked application solvents were passed through the corresponding 47 mm filter assembly containing each filter at 10 mL/min and the filtrate was collected into a clean PFA jar at 50, 100, and 150 mL. The metal concentration for the metal spiked application solvent and each filtrate sample was determined using ICP-MS. The results are presented in Total Metals Removal (%) in Table 6 and Individual Metal Removal % at 100 mL Filtration in FIG. 7. The of PTFE membrane modified with the thermally stable negatively charged monomer SVS shows improved ability to remove metals (including, lithium, sodium, magnesium, aluminum, calcium, titanium, vanadium, chromium, manganese, iron, nickel, copper, zinc, silver, cadmium, tin, barium, and lead) from isopropanol when compared to the unmodified membrane.

TABLE 6

Total Metal Removal (%) from IPA with PTFE Modified with Thermally Stable Negatively Charge Monomer SVS and Unmodified PTFE membrane

| | 0.2 um Membrane | | | | | |
|---|---|---|---|---|---|---|
| | PTFE Modified with Thermally Stable Negatively Charge Monomer SVS | | | Unmodified PTFE membrane | | |
| Application Solvent | Isopropanol | | | | | |
| Filtration Volume (mL) | 50 | 100 | 150 | 50 | 100 | 150 |
| Total Metals Removal (%) | 75.1 | 73.2 | 58.2 | 14.2 | 10.8 | 6.5 |

Example 11

Figure 8:
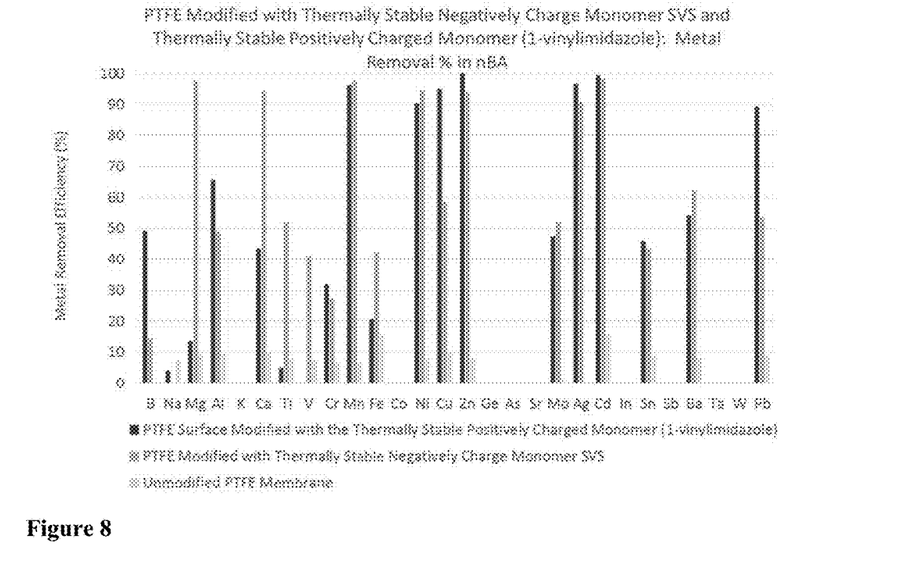

Removal of Metals from nBA by Filtration with PTFE Membrane Modified with the Thermally Stable Negatively Charged Monomer SVS and PTFE Surface Modified with the Thermally Stable Positively Charged (1-vinylimidazole) Monomer This example demonstrates the ability of two PTFE membranes modified with the thermally stable negatively charged monomer SVS or the thermally stable positively charged monomer (1-vinylimidazole) to reduce metals in isopropanol during filtration. The charged PTFE membranes were prepared using a method similar to Example 4 and Example 9 and cut into 47 mm membrane coupons. These membrane coupons were conditioned by washing several times with 10% HCl followed by soaking in 10% HCl overnight and equilibrated with deionized water and secured into a clean 47 mm Filter Assembly (Savillex). The membrane and filter assembly were flushed with Isopropanol Gigabit (KMG) followed by flushing with n-Butyl acetate (nBA). As a control sample, native, Unmodified PTFE was also prepared and conditioned and secured into a filter assembly using the same method. The application solvent was spiked with CONOSTAN Oil Analysis Standard S-21 (SCP Science) at a target concentration of 5 ppb of each metal. To determine the filtration metal removal efficiency the metal spiked application solvents were passed through the corresponding 47 mm filter assembly containing each filter at 10 mL/min and the filtrate was collected into a clean PFA jar at 50, 100, and 150 mL. The metal concentration for the metal spiked application solvent and each filtrate sample was determined using ICP-MS. The results are depicted in Total Metals Removal (%) in Table 7 and Individual Metal Removal % at 100 mL Filtration in FIG. 8. The of PTFE membrane modified with the thermally stable negatively charged monomer SVS, and the PTFE modified with the thermally stable positively charged monomer (1-vinylimidazole) shows improved ability to remove metals (including boron, sodium, magnesium, aluminum, calcium, titanium, vanadium, chromium, manganese, iron, nickel, copper, zinc, molybdenum, silver, cadmium, tin, barium and/or lead) from nBA when compared to the unmodified membrane.

Figure 9:
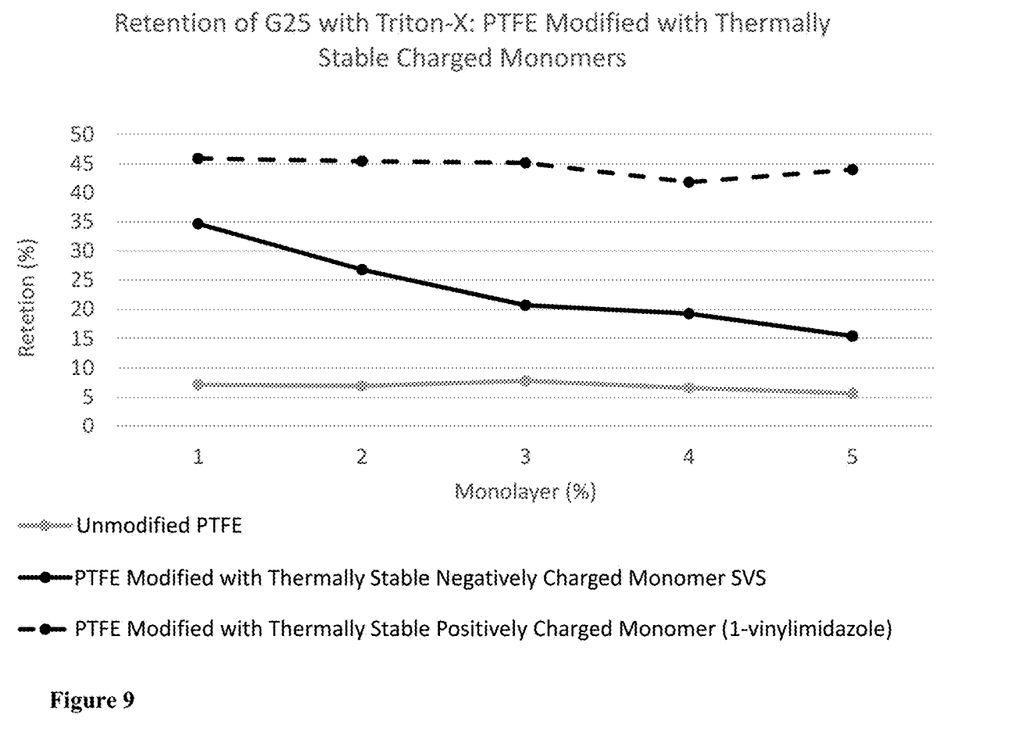

PTFE membrane. A feed solution of 8 ppb G25 Beads with 0.1% Triton-X (Sigma) was prepared in deionized water. Membrane coupons size of 47 mm was cut from membrane rolls, wet with isopropanol, and the membrane was secured into a filter assembly. The membrane assembly containing the wet membranes was flushed deionized water followed by flushing with 0.1% Triton-X in deionized water. The solution prepared with G25 and Triton-X was filtered through the membrane and the filtrate was collected at calculated bead loadings of 0.5, 1, 2, 3, and 4% monolayer. The collected filtrate samples are compared to the 8 ppb G25 Bead 0.1% Triton-X feed solution by calculating the G25 Bead concentration using a fluorescence spectrophotometer. The percent removal at various monolayers for the membranes was graphed in FIG. 9. The PTFE membrane modified with the thermally stable negatively charged monomer SVS, and the PTFE modified with the thermally stable positively charged monomer (1-vinylimidazole), both show improved G25 Bead retention when compared to the unmodified membrane.

The invention claimed is:

1. A filter component comprising:
   a filtration membrane comprising
   a porous fluoropolymer membrane,
   a hydrophilic crosslinked coating placed directly on the porous fluoropolymer membrane, wherein the hydrophilic crosslinked coating comprises thermally stable ionic groups, at least one ionic group-containing reactive compound, and at least one nonionic group-containing reactive compound, and
   an edge; and
   a fluoropolymer end piece,

TABLE 7

Removal of Metals from nBA by Filtration with PTFE Membrane Modified with the Thermally Stable Negatively Charged Monomer SVS and PTFE Surface Modified with the Thermally Stable Positively Charged (1-vinylimidazole) Monomer and Unmodified PTFE membrane.

| | 0.2 um Membrane | | | | | | | | |
|---|---|---|---|---|---|---|---|---|---|
| | PTFE Modified with Thermally Stable Negatively Charge Monomer SVS | | | PTFE Surface Modified with the Thermally Stable Positively Charged Monomer (1-vinylimidazole) | | | Unmodified PTFE membrane | | |
| Application Solvent | nBA | | | | | | | | |
| Filtration Volume (mL) | 50 | 100 | 150 | 50 | 100 | 150 | 50 | 100 | 150 |
| Total Metals Removal (%) | 86.1 | 60.9 | 40.6 | 92.6 | 55.1 | 44.1 | 8.4 | 7.9 | 8.5 |

Example 12

Filter Retention of G25 Beads with PTFE Membrane Modified with the Thermally Stable Negatively Charged Monomer SVS and PTFE Surface Modified with the Thermally Stable Positively Charged (1-vinylimidazole) Monomer Filter retention of G25 Beads (0.025 μm Green Fluorescent Polymer Microspheres, Fluoro-Max) was determined for PTFE Membrane Modified with the Thermally Stable Negatively Charged Monomer SVS and PTFE Surface Modified with the Thermally Stable Positively Charged (1-vinylimidazole) Monomer and compared to Unmodified wherein the edge of the filtration membrane is potted to the end piece with a melt-processable fluoropolymer to provide a fluid-tight seal along the edge, and wherein, after exposure of the filtration membrane to a temperature of at least 240 degrees Celsius for a time sufficient to soften the melt-processable fluoropolymer so that the edge of the filtration membrane is potted to the end piece, the filtration membrane contains at least 50 percent of an amount of ionic groups present on the filtration membrane before the exposure.

2. The filter component of claim 1, wherein the ionic groups comprise negatively charged ionic groups.

3. The filter component of any of claim 2, wherein the ionic groups are selected from: an ionic sulfur-containing group and an ionic phosphorus-containing group.

4. The filter component of claim 3, wherein the ionic groups are selected from a phosphonic acid and a sulfonate.

5. The filter component of claim 1, wherein the ionic groups comprise positively charged ionic groups.

6. The filter component of claim 5, wherein the ionic group is groups comprise an imidazole.

7. The filter component of claim 1, wherein the ionic group-containing reactive compound is selected from 1-vinyl imidazole, vinyl pyridine, vinyl sulfonic acid, sodium vinyl sulfonate, vinyl phosphonic acid, and sodium 4-vinylbenzenesulfonate.

8. The filter component of claim 1, wherein the non-ionic group-containing reactive compound is selected from: methylene bis acrylamide, 2-(dimethylamino)ethyl methacrylate, and 1,4-Butanediol divinyl ether.

9. A filter that includes a filter component of claim 1, the filter comprising:
a fluoropolymer housing surrounding the membrane,
an inlet that allows fluid to flow into the fluoropolymer housing,
an outlet that allows the fluid to flow out of the housing after the fluid passes through the membrane.

10. The filter component of claim 1, wherein the porous fluoropolymer membrane has a pore size in a range of from about 0.001 microns to about 0.05 microns.

11. A filter component comprising:
a filtration membrane comprising:
a porous fluoropolymer membrane,
thermally stable ionic groups, at least one ionic group-containing reactive compound, and at least one non-ionic group-containing reactive compound grafted to the porous fluoropolymer membrane, and
an edge; and
a fluoropolymer end piece, wherein the edge of the filtration membrane is potted to the end piece with a melt-processable fluoropolymer to provide a fluid-tight seal along the edge, and
wherein, after exposure of the filtration membrane to a temperature of at least 240 degrees Celsius for a time sufficient to soften the melt-processable fluoropolymer so that the edge of the filtration membrane is potted to the end piece, the filtration membrane contains at least 50 percent of an amount of ionic groups present on the filtration membrane before the exposure.

12. The filtration membrane of claim 11, wherein the ionic groups comprise negatively charged ionic groups.

13. The filtration membrane of claim 11, wherein the ionic groups are selected from: an ionic sulfur-containing group and an ionic phosphorus-containing group.

14. The filtration membrane of claim 11, wherein the ionic groups comprise positively charged ionic groups.

15. The filtration membrane of claim 14, wherein the ionic groups comprise an imidazole.

* * * * *